Jan. 7, 1969     W. L. GRANT     3,420,738
FUEL ELEMENT ASSEMBLY FOR A NUCLEAR REACTOR
Filed June 3, 1965     Sheet 1 of 4

Inventor
Walter Lawrence Grant
By
Attorney

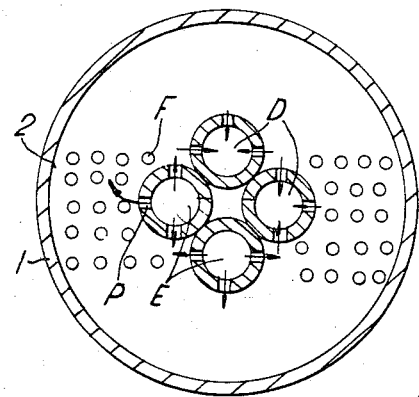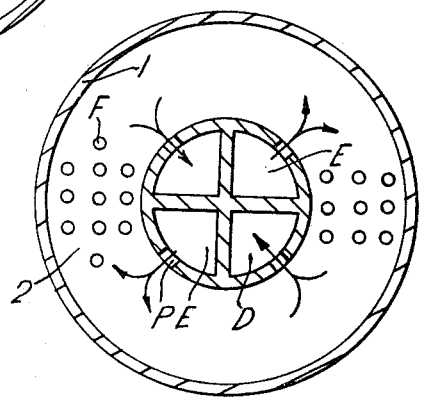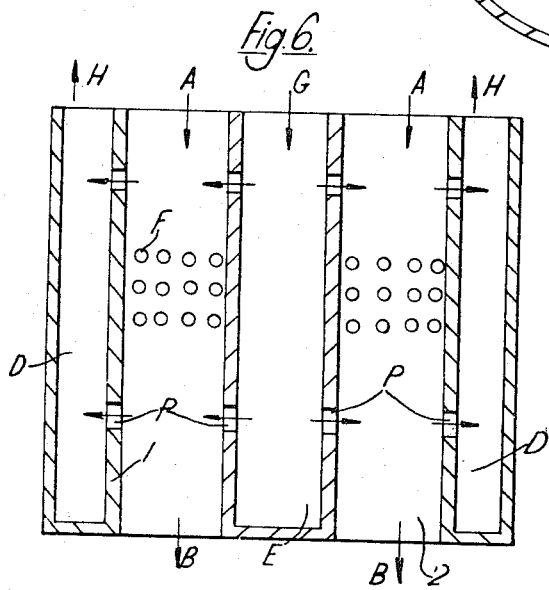

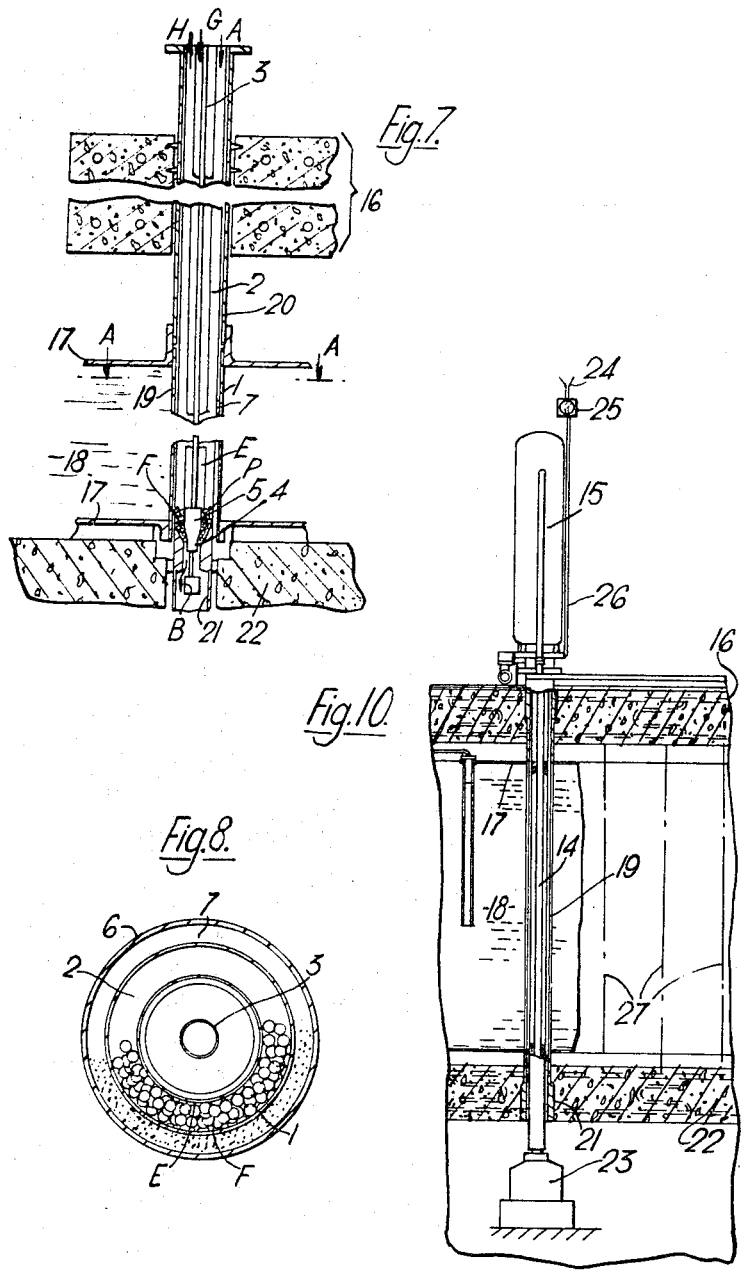

United States Patent Office 3,420,738
Patented Jan. 7, 1969

3,420,738
FUEL ELEMENT ASSEMBLY FOR A NUCLEAR REACTOR
Walter Lawrence Grant, Lynnwood, Pretoria, Transvaal, Republic of South Africa, assignor to Atomic Energy Board, Pelindaba, Transvaal, Republic of South Africa
Filed June 3, 1965, Ser. No. 461,145
Claims priority, application Republic of South Africa, June 11, 1964, 64/2,773
U.S. Cl. 176—72    11 Claims
Int. Cl. G21c 3/22

ABSTRACT OF THE DISCLOSURE

A fuel element assembly for a nuclear reactor, and which includes a tubular fuel container having inside it at least one inflow coolant duct and at least one outflow coolant duct; nuclear fuel granules being receivable in the space defined between the tubular fuel container wall and the ducts, the said ducts having respectively a plurality of longitudinally spaced coolant outflow and inflow openings communicating with the said space.

---

This invention relates to a fuel element assembly for a nuclear reactor. In particular the invention relates to fuel element assemblies using a granular fuel and a liquid metal coolant. Furthermore, the invention relates to replaceable units composed of one or more fuel element assemblies according to this invention and a heat exchanger.

According to this invention there is provided a fuel element assembly for a nuclear reactor consisting of a tubular fuel container with one or more coolant ducts inside the fuel container disposed parallel to and in the vicinity of the longitudinal axis of the fuel container, so as to provide a fuel space in the fuel container wherein granules of nuclear fuel can be packed in the fuel space around the coolant duct(s) and a port or ports in the coolant duct(s) adapted to permit flow of coolant through said ports and in heat exchange relationship with the packed fuel granules to suitable coolant-withdrawal means and fuel supply and withdrawal means provided at opposite ends of the fuel container adapted to permit the granular nuclear fuel to be supplied to or withdrawn from the fuel space when desired.

The nuclear fuel granules can be of any suitable size and shape so that, when they are packed together, voids will be left between the granules through which the coolant can flow. Preferably the granules are in the shape of spheres. The material of the fuel granules can be any suitable nuclear fuel such as uranium, uranium carbides, uranium alloys e.g., with metals such as zirconium, molybdenum, niobium, etc., or uranium cermets or suitable plutonium compounds or mixed uranium-plutonium compounds. Mixtures of $U^{235}$ or $U^{233}$ with thorium giving higher conversion ratios than uranium alone, can also be used. Furthermore, the fuel granules can contain enriched nuclear fuel especially for smaller reactors. In addition, the fuel granules may be clad or unclad.

The ports in the coolant duct(s) may be provided at suitably spaced intervals along the length of the duct(s) and/or around the periphery of such duct(s). The positions of such ports are governed by heat removal and flow considerations. The said ports, when communicating with the fuel space should be small enough to prevent the passage therethrough of the fuel granules in the fuel space. Where the coolant duct is the preferred circular cross-section tube disposed concentrically inside the fuel container, it is preferred to provide a port at that end of the duct which is remote from the coolant inlet end.

Preferably in this case the port is covered by a perforated cover.

The coolant withdrawal means may include separate tubes disposed adjacent and parallel to the coolant ducts referred to above and made of similar material or may be constituted by certain of the longitudinal separate internal partitions in a single coolant duct. In these cases appropriate ports are provided in the coolant withdrawal means to correspond with ports in the adjacent coolant supply ducts so that the coolant can flow from the supply ducts through the ports in such ducts, through the packed granular nuclear fuel in the fuel container, through the corresponding ports in the coolant withdrawal means and thence along the coolant withdrawal means to the coolant outlet means.

Where a liquid metal coolant is used the coolant withdrawal means preferably includes the annular space in the fuel container wherein the granular fuel is packed. In this case the liquid coolant flows down the concentric central duct, through the bottom port therein and up through the packed nuclear fuel in the annular space in the fuel container to suitable coolant outlet means at the same end of the fuel container as the fuel supply means. Suitable sealing means can be supplied to seal the liquid metal coolant from any contact with other incompatible materials that may be used in conjunction with the fuel element assembly.

Where the coolant is a gas such as carbon dioxide or helium, the coolant withdrawal means can include a circular cross-section tube disposed concentrically outside and around the fuel container. In this case the gas coolant can flow along the central coolant duct, through the ports therein, through the packed nuclear fuel in the fuel container, through appropriate ports in the fuel container and thence into the outside coolant withdrawal means. Alternatively the flow can be in the opposite direction, being fed through the outside annular duct, through the fuel in the fuel container into the central coaxial withdrawal duct. Furthermore, the coolant gas flow can be directed, by means of suitably placed baffles in the central coolant duct and the outside annulus and appropriate ports in the walls of the central coolant duct and/or outside annulus, to make many passes through the granular nuclear fuel.

The fuel element assembly operating with a liquid metal coolant is preferably also provided with a gas heat shield around the outside of the fuel container. For this purpose a tube of some suitable material with a low neutron cross-section is disposed concentrically around the outside of the fuel container and the annulus so formed is filled with some suitable gas such as nitrogen or helium.

The fuel element assembly of this invention permits the supply of fresh nuclear fuel and the withdrawal of spent nuclear fuel to be effected during the operation of the reactor at full load through the oppositely situated fuel supply and withdrawal means.

In the preferred embodiment of this invention, using a vertically disposed fuel container and a liquid metal coolant, the fuelling of the fuel element assembly can be done at full load by feeding the fuel granules directly into the annular fuel space in the fuel container. For this purpose fresh fuel can be fed to the fuel bed through a fuel feed tube via an isolating fuel transfer valve. The isolating valve will prevent any fission gases escaping through the fuel feed tube. This is an extra safety measure as there will be no problem of back flow through the feed tube in view of the fact that the pressure in the fuel space is low. The whole isolating valve and associated tubes may be filled with the liquid metal coolant and heated to a suitable temperature when fresh fuel is fed, e.g., above 100° C. in the case of sodium coolant. The fuel granules can then fall by gravity into the fuel annulus and hence to the top of the fuel bed by appropriate manipulation of the isolating valve.

Spent fuel can be removed from the bottom of the fuel element assembly by a suitable extractor. Such extractor can be provided by a rod of suitable material disposed on the longitudinal axis of the fuel container and adapted to close and open the fuel discharge opening at the bottom of the fuel container by appropriate up and down movements. Alternatively the bottom end of the fuel container may be provided wtih a zone or zones adapted to be cooled sufficiently to freeze the liquid metal coolant in the vicinity of such zone or zones so as to block off the bottom end of the fuel space by a plug of frozen coolant wherein fuel granules are embedded. When it is desired to extract spent fuel the cooling of the said zone or zones is discontinued and the said plug is melted, e.g., by heat conducted from the hot parts of the fuel space, thereby allowing spent fuel to pass out of the bottom of the fuel container. Preferably two vertically spaced cooling zones are provided so that by alternately melting the plug of one zone while the other is still frozen the batchwise removal of spent fuel can be effected while continuously supporting the fuel column on a plug of solid coolant.

The bottom end of the fuel element assembly can be made to fit into a suitable discharge stand pipe which, in turn, may be connected to an inclined duct. Between the stand pipe and the fuel element assembly there may be a short length of flexible bellows to take up the differential, axial thermal expansion. The temporary sealed joint between the stand pipe and the fuel element assembly can be made of suitable material such as lead, which has a melting point above that of the coolant, e.g., sodium or lithium 7. The spent fuel coolant mixture can migrate down the heated inclined duct and discharge into a suitable discharge machine which can be positioned and operated remotely to join up with the said duct. The contents of the duct can be emptied into special canisters in the machine and provision can also be made to withdraw this machine into a special bay for maintenance etc. Full and temporary sealed canisters can be transferred from the machine to a process plant, remotely operated, that finally seals the canisters ready for storage in a storage bay. These can be kept there long enough for an appropriate fall-off of activity to occur before being transferred for transport from the site of the nuclear reactor via some suitable remotely operated transfer bay. At the fuel discharge end the spent fuel may be held for a convenient length of time and at a sufficient temperature to allow some of the fission products to plate out, which may otherwise deposit at the position of lowest temperature in the fuel element or heat exchanger.

From the above it will be seen that the fuel throughput in the fuel element assembly can be varied at will, which also gives a means of reactivity control. In fact, the fuel discharge mechanism could be so designed that the fuel could, in an emergency, be discharged into the spent fuel storage space, hence shutting down the reactor. Fuelling will normally be done at full load by feeding the fuel granules directly into the fuel container and by extracting at the same time the spent fuel at the bottom. It is considered that the relatively simple on-load fuelling and spent fuel extraction afforded by this invention is one of its major advantages. The fact that fresh fuel will be added on the top and spent fuel extracted at the bottom of the fuel element assembly also has major burnup advantages.

This invention also provides replaceable units composed of one or more of the fuel element assemblies according to this invention and a heat exchanger. Where the unit consists of more than one fuel element assembly and the heat exchanger, the spacing of the fuel element assemblies is related to the lattice configuration and dimensions of the core.

The heat exchanger is preferably mounted on that end of the fuel element assembly at which fuel and coolant is fed into the assembly and from which the coolant is also withdrawn. In such an integral fuel element-heat exchanger assembly the preferred liquid metal coolant will flow directly from and to the heat exchanger through suitable built-in ducts.

The replaceable units of fuel element assemblies and heat exchanger according to this invention can be removed and installed as integral units. The number and size of such fuel element-heat exchanger units used in the nuclear reactor will vary according to design and power output requirements of such reactor.

The fuel element assemblies of this invention are preferably used with a heavy water moderator comprising a tank of some suitable material such as zirconium or aluminium in which heavy water is kept at approximately atmospheric pressure surrounding the fuel element assemblies of this invention. It is an advantage of such an arrangement that the whole reactor core will be at low pressure—essentially at atmospheric pressure. Hence engineering problems concerning the moderator tank and associated valves, pipes and pumps, will be far simpler than that associated with either pressure tube or pressure vessel designs. The only high temperature components in the reactor core are the fuel element assemblies which, in the preferred form of this invention, are separated from the moderator by the gas heat shield referred to above. This insulating gas, e.g., helium, can be provided at a pressure somewhat above atmospheric, whereas the pressure in the fuel element assembly can be maintained at the lowest possible value by removing all permanent gases. Hence, should any leak occur in the fuel element assembly, there would actually be a gas leak inwards making the whole arrangement inherently safe. In any event, should radioactive liquid metal coolant leak out, it will drain down to the bottom into the spent fuel area which is equipped for handling radioactive fuel and liquid metal coolant.

Suitable pumps can be used whenever required to pump the liquids and gasses employed in the reactor. Thus, in the preferred embodiment of this invention employing the fuel element-heat exchanger units, the liquid metal coolant is preferably pumped by an electromagnetic induction pump of known construction built into the heat exchanger. So also, for gases or nonmetal fluids, suitable centrifugal, axial, diaphragm or the like pumps may be used.

In order to prevent the heavy water moderator from boiling as well as to maintain the required reactivity of the reactor, heavy water can be continuously pumped through a heavy water heat exchanger and the temperature thereby regulated to the desired value. For emergency shutdown, a dump tank with gas-controlled heavy water level regulators can be incorporated so that, in case of emergency, the gas pressure can be made to decrease and the heavy water made to flow into the dump tank shutting off the reactor. Normally, however, the heavy water tank will be filled and heavy water will be pumped continuously from the dump tank to the moderator tank and then drained via the dump valve.

For fine control of the reactor the heavy water temperature could be varied, although this should normally be as low as possible. Control can conveniently and preferably be done by means of heavy water voids whereby a suitable gas such as helium can be introduced into the void control immersion tube.

The nuclear reactor core is preferably housed in a suitable reactor building providing sufficient shielded head room above the reactor core for insertion and removal of fuel element-heat exchanger assemblies. The area above the core can conveniently be served by a crane which can be operated remotely in the active area. Provision can be made in the reactor building for such crane to be run from the active area to a position in a nonactive area. There are two main reasons for this arrangement. Firstly, different remote handling machines will be attached to the crane, e.g., one for refueling on load, another for making and breaking the various connections for the installation and removal of the fuel element-heat exchanger assemblies from the reactor core. Secondly, the crane and mechanisms can be satisfactorily maintained to ensure reliable operation thereof. The nonactive area into which the crane can move can be arranged to be a fuel element-heat exchanger assembly receiving bay.

A suitable service crane can be used to move such assemblies from the storage racks to a position convenient for lifting and finally placing into the reactor core.

The active fuel element-heat exchanger assemblies removed from the core can also be stored in a similar shielded bay with the same storage capacity. In this case the service crane over the storage racks is remotely operated and the transfer of the said assembly from this bay for transport away from the site can also be done remotely.

The remotely operated mechanisms at the top of the reactor core can be adapted to couple or uncouple the various connections to the fuel element-heat exchanger assemblies. Such connections, provided for each fuel element-heat exchanger assembly, will be concerned with water or steam pipes, electrical connections, monitoring connections, fission product removal connections, etc.

The reactor building can also provide, at suitable sites around the reactor core, other conventional facilities such as the turbine hall, control rooms and the like.

By way of example certain embodiments of this invention will now be described with reference to the annexed drawings in which:

FIG. 4 is a diagrammatic cross-section of FIGURE 3.

FIG. 5 is a diagrammatic cross-section of a modification of the embodiment of FIGURES 3 and 4.

FIG. 6 is a diagrammatic representation of a further embodiment of the fuel element assembly according to this invention.

FIG. 7 is an elevational view in section of a preferred construction of the fuel element assembly of this invention.

FIG. 8 is a cross-section of the fuel element assembly along lines 8—8 of FIGURE 7.

FIG. 10 indicates the layout of a nuclear reactor employing the fuel element assemblies of this invention.

FIGS. 1 to 6 illustrate diagrammatically fuel element assemblies for a nuclear reactor consisting in each case of a tubular fuel container 1 with one or more coolant ducts E inside the fuel container disposed parallel to and in the vicinity of the longitudinal axis of the fuel container, so as to provide a fuel space 2 in the fuel container wherein granules of nuclear fuel F can be packed in the fuel space around the coolant duct(s) and a port or ports P in the coolant duct(s) adapted to permit flow of coolant through said ports and in heat exchange relationship with the packed fuel granules to suitable coolant withdrawal means D and fuel supply A and withdrawal B means provided at opposite ends of the fuel container adapted to permit the granular nuclear fuel to be supplied to or withdrawn from the fuel space when desired.

Figure 1:
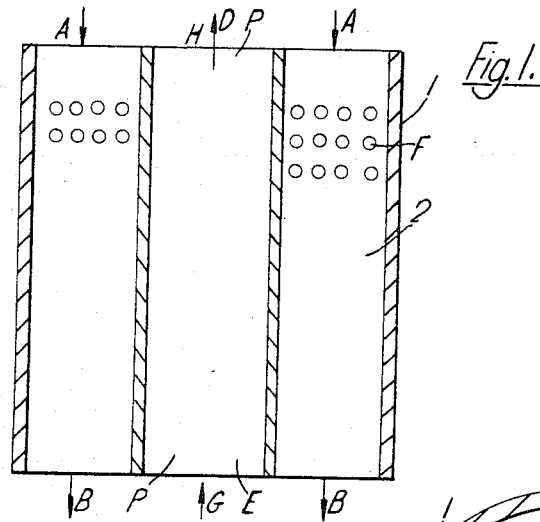
FIG. 1 is a diagrammatic representation of one embodiment of a fuel element assembly according to this invention.
Figure 2:
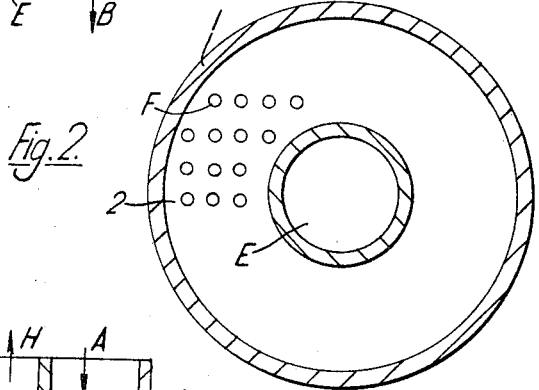
FIG. 2 is a diagrammatic cross-section of FIGURE 1.

In FIGS. 1 and 2 the coolant duct E is a single circular cross-section duct concentrically situated inside the circular cross-section fuel container 1 and provided with ports P at opposite ends thereof which provide respectively the coolant inlet at G and the coolant outlet at H which outlet communicates with suitable coolant withdrawal means D. The granular nuclear fuel F is fed into the fuel space 2 by suitable fuel supply means A and withdrawn therefrom by suitable fuel withdrawal means B at the opposite end of the fuel element assembly. It will be noted that the coolant flows in countercurrent direction to the nuclear fuel and is in heat exchange relationship with the fuel through the wall of the coolant duct E. Alternatively the coolant could flow concurrently with the nuclear fuel.

Figure 3:
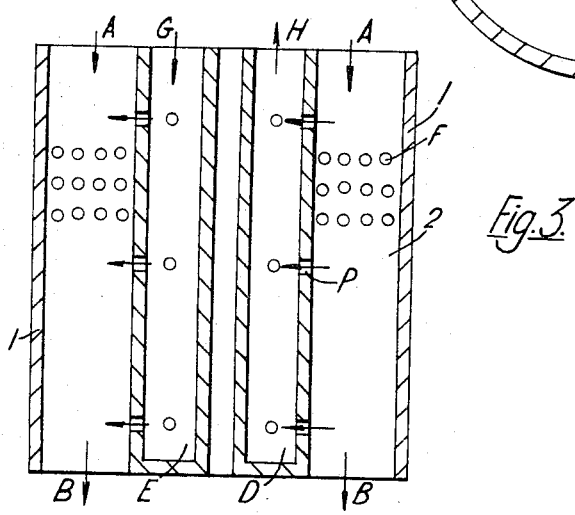
FIG. 3 is a diagrammatic representation of a further embodiment of a fuel element assembly according to this invention.

In the embodiment of FIGS. 3 and 4 there are two circular cross-section coolant ducts E disposed parallel to and in the vicinity of the longitudinal axis of the fuel container and the coolant withdrawal means includes two similarly disposed circular cross-section tubes D. The coolant inlet into ducts E is at G and the coolant outlet from the tubes D is at H. As is shown in the drawings the ends of the passages E and D opposite to G and H respectively are closed off but the coolant is permitted to flow out of the passages E and into the passages D through suitable ports P so that the coolant is permitted to flow through the voids between and in direct contact with the packed nuclear fuel granules F in the fuel space 2 so as to achieve efficient heat exchange.

The embodiment of FIG. 5 is generally similar to that of FIGS. 3 and 4 except that the passages E and D are not here constituted by separate tubes but by the separate passages created by internally longitudinally subdividing a single circular cross-section tube so as to form four separate passageways.

In the embodiment of FIG. 6, which is suitable for a gaseous coolant, the coolant is supplied through inlet G into the coolant duct E wherefrom it flows through ports P into the fuel space 2, through the voids between the packed nuclear fuel F, through the ports P in the fuel container 1 and into coolant withdrawal means D consisting of the annular space provided between the circular cross-section fuel container 1 and a wider diameter circular cross-section outer tube disposed concentrically therewith, to the coolant outlet H. Here again the passages E and D are closed off at the ends opposite to G and H.

In the embodiment shown in FIGS. 7 and 8 the coolant is fed through the coolant inlet G into the coolant duct E consisting of a single circular cross-section tube from which the coolant flows through the port P at the opposite end of the coolant duct into the fuel space 2 formed by the annular space between the coolant duct E and the circular cross-section concentrically disposed fuel container 1. The coolant flows to coolant outlet H through the voids between the packed granules of nuclear fuel F which is fed into the fuel space 2 by suitable fuel supply means A and withdrawn therefrom by fuel withdrawal means B. In this embodiment the fuel withdrawal means comprises a rod 3 of suitable material disposed on the longitudinal axis of the fuel container and adapted to close and open the fuel discharge opening 4 at the bottom of the fuel container by appropriate up and down movements of the tapered plug 5.

Concentrically disposed around the outside of the fuel container 1 is a further circular cross-section tube 6 of suitable material but having a larger diameter than the fuel container 1 so as to provide an annular space 7 around the outside of the fuel container which annular space is filled with some suitable gas such as nitrogen or helium to form a gas heat shield around the outside of the fuel container. The gas is preferably provided at a pressure somewhat above atmospheric whereas the pressure in the fuel space 2 can be maintained at the lowest possible value by removing all permanent gases and should in any event be maintained at a pressure lower than the gas in the gas heat shield.

Figure 9:
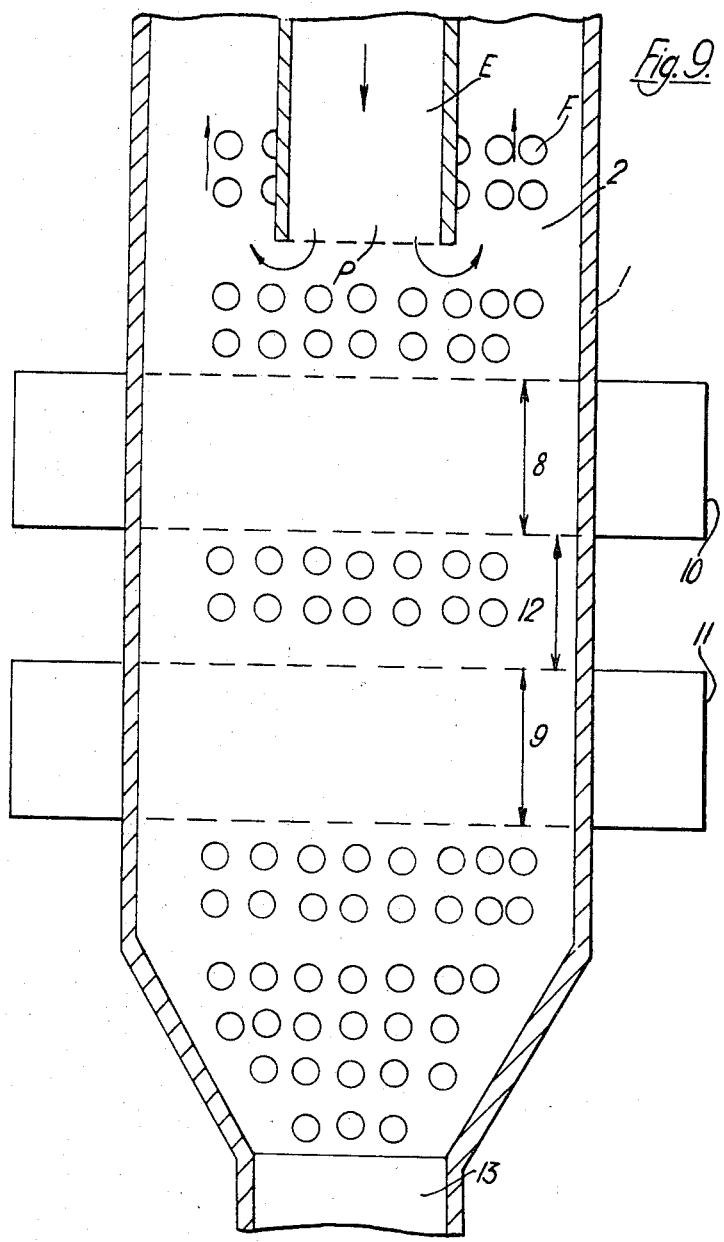
FIG. 9 is a diagrammatic sectioned elevational view of the bottom end of a fuel element assembly illustrating an alternative fuel withdrawal means.

FIG. 9 illustrates alternative fuel withdrawal means. In this embodiment a liquid metal coolant e.g. liquid sodium, flows down through the coolant duct E out through the port P into the fuel space 2 packed with the granular nuclear fuel F and up through the voids between the fuel granules to the coolant outlet H situated at the top of the fuel element assembly as in FIG. 7. The fuel container 1 extends downward below the port P in the coolant duct E and on this downward extension there are provided two zones 8 and 9 respectively which are adapted to be cooled by suitable cooling means 10 and 11 surrounding the fuel container 1. Each of the said cooling means 10 and 11 is adapted to cool the corresponding zone 8 or 9 sufficiently to freeze the liquid metal coolant therein so as to form a plug composed of solid coolant containing spent fuel granules entrapped therein. To operate this fuel withdrawal means the cooling means 10 is actuated to form a plug of solid coolant in zone 8 which plug is designed to be of suitable dimensions so as to enable it to support the column of liquid coolant and granular fuel in the fuel space 2 above it. A similar plug also extends over zone 9 as a result of appropriate actuation of cooling means 11. By discontinuing the actuation of cooling means 10 plug 8 will be melted by heat conducted through the liquid metal coolant and granular fuel above it from the heat generated in the active granular nuclear fuel thereby permitting spent nuclear fuel to settle down by gravity through zone 8 onto the plug in zone 9. Cooling means 10 is then again actuated so as to freeze a plug in zone 8 whereafter the actuation of cooling means 11 is discontinued permitting plug 9 to melt by heat conducted from the still hot liquid metal coolant and spent granular fuel in the space 12 between zones 8 and 9. This permits the spent nuclear fuel to pass, under the influence of gravity, through the discharge passage 13 to suitable spent fuel disposal means.

Instead of employing two cooling zones 8 and 9 and attendant cooling means 10 and 11 only one can be used. Furthermore, instead of relying on heat supplied by conduction from the active nuclear fuel in the fuel space 2 heat may be actually supplied from suitable heating means associated with the cooling means 10 and 11. Any suitable and well known cooling or heating means may be employed.

In FIG. 10, 14 indicates a fuel element assembly constructed according to FIGS. 7, 8 or 9 as a replaceable unit with the preferred heat exchanger 15. The fuel element assembly-heat exchanger unit is vertically disposed with the heat exchanger above the top concrete shield 16 of the reactor and with the fuel element assembly 14 extending through the top shield 16 into the moderator tank 17 which is filled with heavy water moderator 18. The outer tube 6 of the gas shield of the fuel element assembly as shown in FIG. 8 is conveniently provided partly by a heavy water callandria tube 19 extending through the heavy water tank 17 from the top to the bottom thereof and partly by a metal tube 20 extending through the top shield 16 to the top of the heavy water tank 17. The fuel element heat exchanger unit is adapted to be fitted into or removed from the passage so provided by the said tubes 19 and 20.

A metal tube 21, similar to tube 20, extends from the bottom of the heavy water tank through the bottom shield 22 so as to enable the spent fuel withdrawal means of the fuel element assembly to communicate with suitable spent fuel discharge facilities 23 situated below the bottom shield 22.

Fresh granular nuclear fuel is fed to the fuel space in the fuel element assembly from a suitable fresh fuel input means 24 through an isolating valve 25 and a fuel supply tube 26.

Further fuel element-heat exchanger replaceable units can be provided at other positions indicated generally by their centrelines 27 in accordance with the requirements of the nuclear reactor concerned, the spacing of the fuel element assemblies being related to the lattice configuration and dimensions of the reactor core.

I claim:

1. A fuel element assembly for a nuclear reactor, which includes a tubular fuel container having at least two coolant ducts disposed longitudinally inside the fuel container so as to provide a fuel space in the fuel container and nuclear fuel which is accommodated around said at least two coolant ducts, said coolant ducts having a plurality of longitudinally spaced ports communicating with said fuel space, one of said coolant ducts being adapted for connection to coolant supply means and the other of said coolant ducts being adapted for connection to coolant withdrawal means.

2. A fuel element assembly as claimed in claim 1, in which at least some of the ports in the coolant ducts are directed radially from the longitudinal axis of the fuel container.

3. A fuel element assembly as claimed in claim 1, in which the coolant ducts are integral with each other, being separated from each other by a partition wall.

4. A fuel element assembly for a nuclear reactor and which includes means for mounting it such that its longitudinal axis is directed upwardly; a tubular fuel container having at least one coolant duct disposed inside the fuel container parallel to and in the vicinity of the longitudinal axis of the fuel container so as to provide a fuel space in the fuel container and nuclear fuel which is accommodated around the coolant duct, the coolant duct having at least one port communicating with the fuel space; fuel supply means at the upper end of the fuel container; and fuel withdrawal means at its lower end and including at least one zone at the bottom end of the fuel container below the level of the port in the coolant duct, and cooling means adapted to cool the fuel space sufficiently to freeze coolant in the fuel space to form a frozen plug of coolant to block off the bottom end of the fuel space.

5. A fuel element assembly according to claim 4, in which two such zones are provided at vertically spaced positions with cooling means that are adapted to permit the alternate melting of the plug of one zone while the plug of the other zone is still frozen, thereby enabling the removal of spent fuel while continuously supporting the fuel column in the fuel space on a plug of solid coolant.

6. A fuel element assembly for a nuclear reactor which includes a tubular fuel container having at least two coolant ducts disposed longitudinally inside the fuel container so as to provide a fuel space in the fuel container and nuclear fuel which is accommodated around said at least two coolant ducts, said coolant ducts having a plurality of longitudinally spaced ports communicating with said fuel space, one of said coolant ducts being adapted for connection at one end of the assembly to coolant supply means, and the other of said coolant ducts being adapted for connection at the same end of the assembly to coolant withdrawal means.

7. A fuel element assembly for a nuclear reactor which includes a tubular fuel container; at least two coolant ducts disposed longitudinally within said tubular container, a fuel space being defined within said tubular fuel container, nuclear fuel accommodated around said at least two coolant ducts; and fuel supply and withdrawal means at opposite ends of said fuel container, adapted to permit the supply and withdrawal of nuclear fuel to and from said fuel space as desired; said coolant ducts having a plurality of longitudinally spaced ports communicating with said fuel space, one of said coolant ducts being adapted for connection to coolant supply means, and the other of said coolant ducts being adapted for connection to coolant withdrawal means.

8. A fuel element assembly for a nuclear reactor which includes a tubular fuel container; means for mounting the assembly such that its axis is directed upwardly; at least two coolant ducts disposed longitudinally within said tubular container so as to provide a fuel space in said tubular container and nuclear fuel which is accommodated around said at least two coolant ducts, said coolant ducts having a plurality of longitudinally spaced ports communicating with said fuel space; at the upper end of the assembly, connecting means for connecting one of said coolant ducts to coolant supply means, and connecting means for connecting the other of said coolant ducts to coolant withdrawal means; fuel supply means at the upper end of said tubular container; and fuel withdrawal means at the lower end of said tubular container.

9. A fuel element assembly for a nuclear reactor and which includes:
(a) a tubular fuel container;
(b) means for mounting the assembly such that its axis is directed upwardly;
(c) at least two coolant ducts disposed longitudinally within said tubular container so as to provide a fuel space in said tubular container and nuclear fuel which is accommodated around said at least two coolant ducts, said coolant ducts having a plurality of longitudinally spaced ports communicating with said fuel space;
(d) at the upper end of the assembly, connecting means for connecting the one of said coolant ducts to coolant supply means and connecting means for connecting the other of said coolant ducts to coolant withdrawal means;
(e) fuel supply means at the upper end of said tubular container;
(f) at the lower end of said tubular container fuel withdrawal means which includes
(i) at least one zone in said tubular container below the level of the lowest ports in said coolant ducts; and
(ii) cooling means adapted to freeze coolant in the said zone to form a plug of frozen coolant to block off the bottom end of said fuel space, said fuel container extending below the level of the lowest ports in said coolant ducts.

10. A fuel element assembly for a nuclear reactor which includes:
(a) a tubular fuel container;
(b) means for mounting the assembly such that its axis is directed upwardly;
(c) at least two coolant ducts disposed longitudinally within said tubular container so as to provide a fuel space in said tubular container and nuclear fuel which is accommodated around said at least two coolant ducts, said coolant ducts having a plurality of longitudinally spaced ports communicating with said fuel space;
(d) at the upper end of the assembly, connecting means for connecting the one of said coolant ducts to coolant supply means and connecting means for connecting the other of said coolant ducts to coolant withdrawal means;
(e) fuel supply means at the upper end of said tubular container; and
(f) at the lower end of said tubular container fuel withdrawal means which includes
(i) at least one zone in said tubular container; and
(ii) cooling means adapted to freeze coolant in the said zone to form a plug of frozen coolant to block off the bottom end of said fuel space.

11. A fuel element assembly for a nuclear reactor and which includes
(a) a tubular fuel container;
(b) means for mounting the assembly such that its axis is directed upwardly;
(c) at least two coolant ducts disposed longitudinally within said tubular container so as to provide a fuel space in said tubular container and nuclear fuel which is accommodated around said at least two coolant ducts, said coolant ducts having a plurality of longitudinally spaced ports communicating with said fuel space;
(d) at the upper end of the assembly, connecting means for connecting the one of said coolant ducts to coolant supply means and connecting means for connecting the other of said coolant ducts to coolant withdrawal means;
(e) fuel supply means at the upper end of said tubular container;
(f) at the lower end of said tubular container fuel withdrawal means which includes
(i) two zones in the fuel container at different elevations positions; and
(ii) cooling means adapted to freeze coolant in each of the said zones to form plugs of frozen coolant to block off the bottom end of the fuel space, thereby to permit the alternate melting of the plug of one zone, while the plug of the other zone is still frozen, and thereby enabling the removal of spent nuclear fuel while continuously supporting the fuel column in the fuel space on a plug of solid coolant.

References Cited
UNITED STATES PATENTS

| | | | |
|---|---|---|---|
| 3,034,689 | 5/1962 | Stoughton | 176—59 X |
| 3,071,527 | 1/1963 | Young | 176—52 |
| 3,281,326 | 10/1966 | Hargo | 176—61 X |

FOREIGN PATENTS

| | | |
|---|---|---|
| 845,804 | 8/1960 | Great Britain. |
| 946,901 | 1/1964 | Great Britain. |
| 674,773 | 11/1963 | Canada. |

BENJAMIN R. PADGETT, *Primary Examiner.*

A. J. STEINER, *Assistant Examiner.*

U.S. Cl. X.R.

176—68